(12) United States Patent
Hao et al.

(10) Patent No.: US 12,088,376 B2
(45) Date of Patent: Sep. 10, 2024

(54) CSI REPORT CONFIGURATION FOR MULTI-TRP TRANSMISSION

(71) Applicant: QUALCOMM Incorporated, San Diego, CA (US)

(72) Inventors: Chenxi Hao, Beijing (CN); Yu Zhang, Beijing (CN); Liangming Wu, Beijing (CN); Qiaoyu Li, Beijing (CN); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 578 days.

(21) Appl. No.: 17/274,412

(22) PCT Filed: Sep. 21, 2018

(86) PCT No.: PCT/CN2018/106874
§ 371 (c)(1),
(2) Date: Mar. 8, 2021

(87) PCT Pub. No.: WO2020/056708
PCT Pub. Date: Mar. 26, 2020

(65) Prior Publication Data
US 2021/0328644 A1 Oct. 21, 2021

(51) Int. Cl.
*H04B 7/06* (2006.01)
*H04B 7/0456* (2017.01)
*H04L 5/00* (2006.01)

(52) U.S. Cl.
CPC ......... *H04B 7/0626* (2013.01); *H04B 7/0486* (2013.01); *H04B 7/0632* (2013.01); *H04B 7/0639* (2013.01); *H04L 5/0051* (2013.01)

(58) Field of Classification Search
CPC .. H04B 7/0626; H04B 7/0486; H04B 7/0632; H04B 7/0639; H04B 7/0645; H04L 5/0051; H04L 5/0007; H04L 5/005; H04L 5/0057
See application file for complete search history.

(56) References Cited

U.S. PATENT DOCUMENTS 9,973,312 B2 * 5/2018 Wu ...................... H04B 7/0626
10,826,577 B2 11/2020 Wei et al.
(Continued)

FOREIGN PATENT DOCUMENTS

| CN | 104081813 A | 10/2014 |
|---|---|---|
| CN | 104811288 A | 7/2015 |

(Continued)

OTHER PUBLICATIONS

QUALCOMM Incorporated: "Discussion on QCL", 3GPP Draft, 3GPP TSG RAN WG1 NR Ad-Hoc#2, R1-1711176, 3rd Generation Partnership Project (3GPP), Mobile Competence Centre, 650, Route Des, Lucioles, F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051300376, pp. 1-4, Retrieved from the Internet, URL: http://www.3gpp.org/ftp/Meetings_3GPP_SYNC/RAN1/Docs/ [Retrieved on Jun. 26, 2017] paragraph [02 .1] section 2.4.

(Continued)

*Primary Examiner* — Harry H Kim
(74) *Attorney, Agent, or Firm* — Patterson + Sheridan, L.L.P./Qualcomm

(57) ABSTRACT

Certain aspects of the present disclosure provide techniques for a channel state information (CSI) report configuration for a multiple transmission reception point (TRP) transmission, such as a non-coherent joint transmission (NCJT). A method by a base station (BS) includes providing a user equipment (UE) with a CSI report configuration. The CSI report
(Continued)

| indexes | resources | rank |
|---|---|---|
| 0 - 7 | res1 | 1 - 8 |
| 8 - 15 | res2 | 1 - 8 |
| 16 - 23 | res3 | 1 - 8 |
| 24 - 33 | Res1 res2 | (1,1), (1,2), (2,1), (2,2), (3,2), (2,3), (3,3), (4,3), (3,4) (4,4) |
| 34 - 43 | Res1 res3 | (1,1), (1,2), (2,1), (2,2), (3,2), (2,3), (3,3), (4,3), (3,4) (4,4) |
| 44 - 53 | Res2 res3 | (1,1), (1,2), (2,1), (2,2), (3,2), (2,3), (3,3), (4,3), (3,4) (4,4) | configuration is associated with one or more CSI reference signal (RS) resources. Each CSI-RS resource comprising a set of ports or port groups. The BS signals the UE to enable the UE to send a CSI report including CSI for more than one CSI-RS resource or for a CSI-RS resource comprising more than one port group and receives a CSI report from the UE.

20 Claims, 11 Drawing Sheets

(56) References Cited

U.S. PATENT DOCUMENTS

| | | | | |
|---|---|---|---|---|
| 2019/0215044 A1* | 7/2019 | Noh | ..................... | H04L 5/1469 |
| 2020/0099473 A1* | 3/2020 | Han | ..................... | H04L 5/0048 |
| 2020/0119797 A1* | 4/2020 | Wang | ................... | H04B 7/0632 |
| 2020/0295894 A1* | 9/2020 | Kang | .................... | H04L 5/0026 |

FOREIGN PATENT DOCUMENTS

| | | |
|---|---|---|
| CN | 107666340 A | 2/2018 |
| CN | 108039903 A | 5/2018 |
| CN | 108141267 A | 6/2018 |
| CN | 108282212 A | 7/2018 |
| CN | 108476049 A | 8/2018 |
| WO | 2018027908 A1 | 2/2018 |
| WO | 2018117666 A1 | 6/2018 |
| WO | 2020051896 A1 | 3/2020 |
| WO | 2020052428 A1 | 3/2020 |

OTHER PUBLICATIONS

Supplementary European Search Report—EP18934269—Search Authority—The Hague—Mar. 25, 2022.
International Search Report and Written Opinion—PCT/CN2018/106874—ISA/EPO—May 5, 2019.

* cited by examiner

| indices | resources | | rank |
|---|---|---|---|
| 0 – 7 | res1 | | 1 - 8 |
| 8 – 15 | res2 | | 1 - 8 |
| 16 – 23 | res3 | | 1 - 8 |
| 24 – 33 | Res1 | res2 | (1,1), (1,2), (2,1), (2,2), (3,2), (2,3), (3,3), (4,3), (3,4), (4,4) |
| 34 – 43 | Res1 | res3 | (1,1), (1,2), (2,1), (2,2), (3,2), (2,3), (3,3), (4,3), (3,4), (4,4) |
| 44 – 53 | Res2 | res3 | (1,1), (1,2), (2,1), (2,2), (3,2), (2,3), (3,3), (4,3), (3,4), (4,4) |

FIG. 8

CSI REPORT CONFIGURATION FOR MULTI-TRP TRANSMISSION

CROSS-REFERENCE TO RELATED APPLICATIONS

This application is a national stage application under 35 U.S.C. 371 of PCT/CN2018/106874, filed Sep. 21, 2018, which is incorporated herein by reference in its entirety.

INTRODUCTION

Field of the Disclosure

Aspects of the present disclosure relate to wireless communications, and more particularly, to techniques for a channel state information (CSI) report configuration for a multiple transmission reception point (TRP) transmission, such as a non-coherent joint transmission (NCJT).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DUT).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a base station (BS). The method generally includes providing a user equipment (UE) with a channel state information (CSI) report configuration. The CSI report configuration is associated with one or more CSI reference signal (RS) resources. Each CSI-RS resource includes a set of ports or port groups. The method generally includes signaling the UE to enable the UE to send a CSI report including CSI for more than one CSI-RS resource or for a CSI-RS resource comprising more than one port group. The method generally includes receiving a CSI report from the UE.

Certain aspects provide a method for wireless communication by a UE. The method generally includes receiving a CSI report configuration. The CSI report configuration is associated with one or more CSI-RS resources. Each CSI-RS resource includes a set of ports or port groups. The method generally includes receiving signaling enabling the UE to send a CSI report including CSI for more than one CSI-RS resource or for a CSI-RS resource comprising more than one port groups. The method generally includes sending a CSI report.

Certain aspects provide an apparatus for wireless communication. The apparatus generally includes means for providing a UE with a CSI report configuration. The CSI report configuration is associated with one or more CSI-RS resources. Each CSI-RS resource includes a set of ports or port groups. The apparatus generally includes means for signaling the UE to enable the UE to send a CSI report including CSI for more than one CSI-RS resource or for a CSI-RS resource comprising more than one port group. The apparatus generally includes means for receiving a CSI report from the UE.

Certain aspects provide an apparatus for wireless communication. The apparatus generally includes means for receiving a CSI report configuration. The CSI report configuration is associated with one or more CSI-RS resources. Each CSI-RS resource includes a set of ports or port groups. The apparatus generally includes means for receiving signaling enabling the apparatus to send a CSI report including CSI for more than one CSI-RS resource or for a CSI-RS resource comprising more than one port groups. The apparatus generally includes means for sending a CSI report.

Certain aspects provide an apparatus for wireless communication. The apparatus generally includes at least one processor coupled with a memory and configured to provide a UE with a CSI report configuration. The CSI report configuration is associated with one or more CSI-RS resources. Each CSI-RS resource includes a set of ports or port groups. The apparatus generally includes a transmitter configured to signal the UE to enable the UE to send a CSI report including CSI for more than one CSI-RS resource or for a CSI-RS resource comprising more than one port group. The apparatus generally includes a receiver configured to receive a CSI report from the UE.

Certain aspects provide an apparatus for wireless communication. The apparatus generally includes a receiver configured to receive a CSI report configuration. The CSI report configuration is associated with one or more CSI-RS resources. Each CSI-RS resource includes a set of ports or port groups. The receiver is further configured to receive signaling enabling the apparatus to send a CSI report including CSI for more than one CSI-RS resource or for a CSI-RS resource comprising more than one port groups. The apparatus generally includes a transmitter configured to send a CSI report.

Certain aspects provide a computer readable medium having computer executable code stored thereon for wireless communication. The computer readable medium generally includes code for providing a UE with a CSI report configuration. The CSI report configuration is associated with one or more CSI-RS resources. Each CSI-RS resource includes a set of ports or port groups. The computer readable medium generally includes code for signaling the UE to enable the UE to send a CSI report including CSI for more than one CSI-RS resource or for a CSI-RS resource comprising more than one port group. The computer readable medium generally includes code for receiving a CSI report from the UE.

Certain aspects provide a computer readable medium having computer executable code stored thereon for wireless communication. The computer readable medium generally includes code for receiving a CSI report configuration. The CSI report configuration is associated with one or more CSI-RS resources. Each CSI-RS resource includes a set of ports or port groups. The computer readable medium generally includes code for receiving signaling enabling the apparatus to send a CSI report including CSI for more than one CSI-RS resource or for a CSI-RS resource comprising more than one port groups. The computer readable medium generally includes code for sending a CSI report.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 is a table illustrating example illustrating an index mapping for a jointly encoded rank indicator (RI) and CSI-RS resource indicator (SRI), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
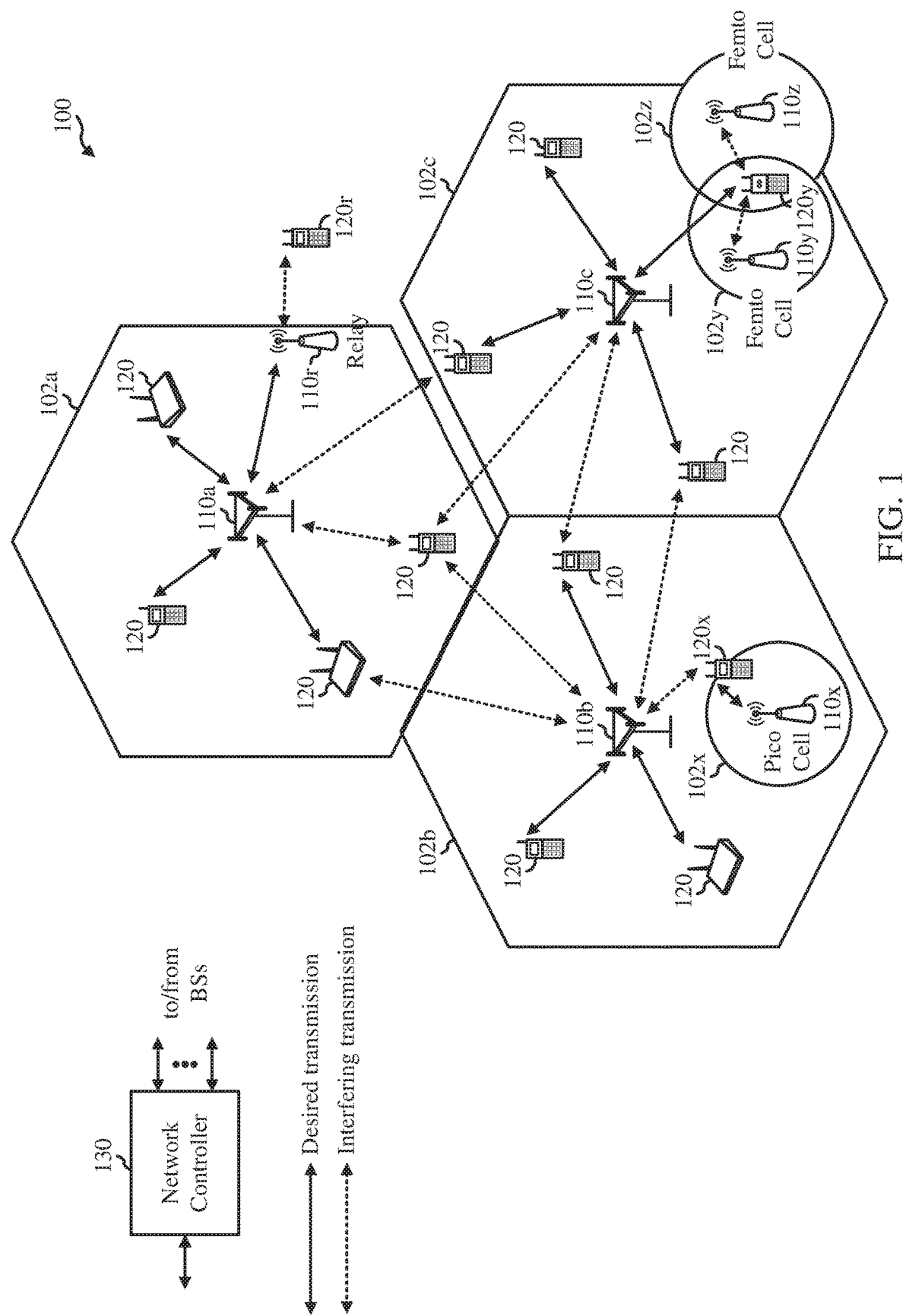
FIG. 1 is a block diagram conceptually illustrating an example telecommunications system, in accordance with certain aspects of the present disclosure.

Aspects of the present disclosure provide apparatus, methods, processing systems, and computer readable mediums for a channel state information (CSI) report configuration for a multiple transmission reception point (TRP) transmission, such as a non-coherent joint transmission (NCJT).

In certain systems, a user equipment (UE) is provided with a CSI report configuration. The UE may be configured with at least one CSI reference signal (RS) resource for channel measurement. The UE may be configured to select one CSI-RS resource for CSI reporting. The UE may report a CSI-RS resource indicator (CRI) for the selected CSI-RS resource along with the CSI for that CSI-RS resource. This type of CSI report configuration may be useful to support single TRP (transmission reception point) transmission. However, some systems may support multi-TRP transmission, such as non-coherent joint transmission (NCJT), where the CSI-RS of different TRPs may be transmitted in different CSI-RS resources or port groups.

Accordingly, what is needed is CSI report configuration for multi-TRP transmission.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA. SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA, cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX). IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA. E-UTRA. UMTS, LTE. LTE-A and GSM are described in documents from an organization named "3rd Generation Partnership Project" (3GPP), cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. A BS 110 in the wireless communication network 100 may provide a UE 120 with a channel state information (CSI) report configuration. The CSI report configuration is associated with one or more CSI reference signal (RS) resources. Each CSI-RS resource includes a set of ports or port groups. The BS 110 signals the UE 120 to enable the UE to send a multi-TPR CSI report, for example a CSI report including CSI for more than one CSI-RS resource or for a CSI-RS resource including more than one port group. In this case the report may include multiple rank indicators (RIs) and/or precoding matrix indicators (PMIs). The BS 110 receives a CSI report from the UE 120 according to the CSI report configuration.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a. 110b and 110c may be macro BSs for the macro cells 102a, 102b and 102c, respectively. The BS 101x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x. 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example. UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
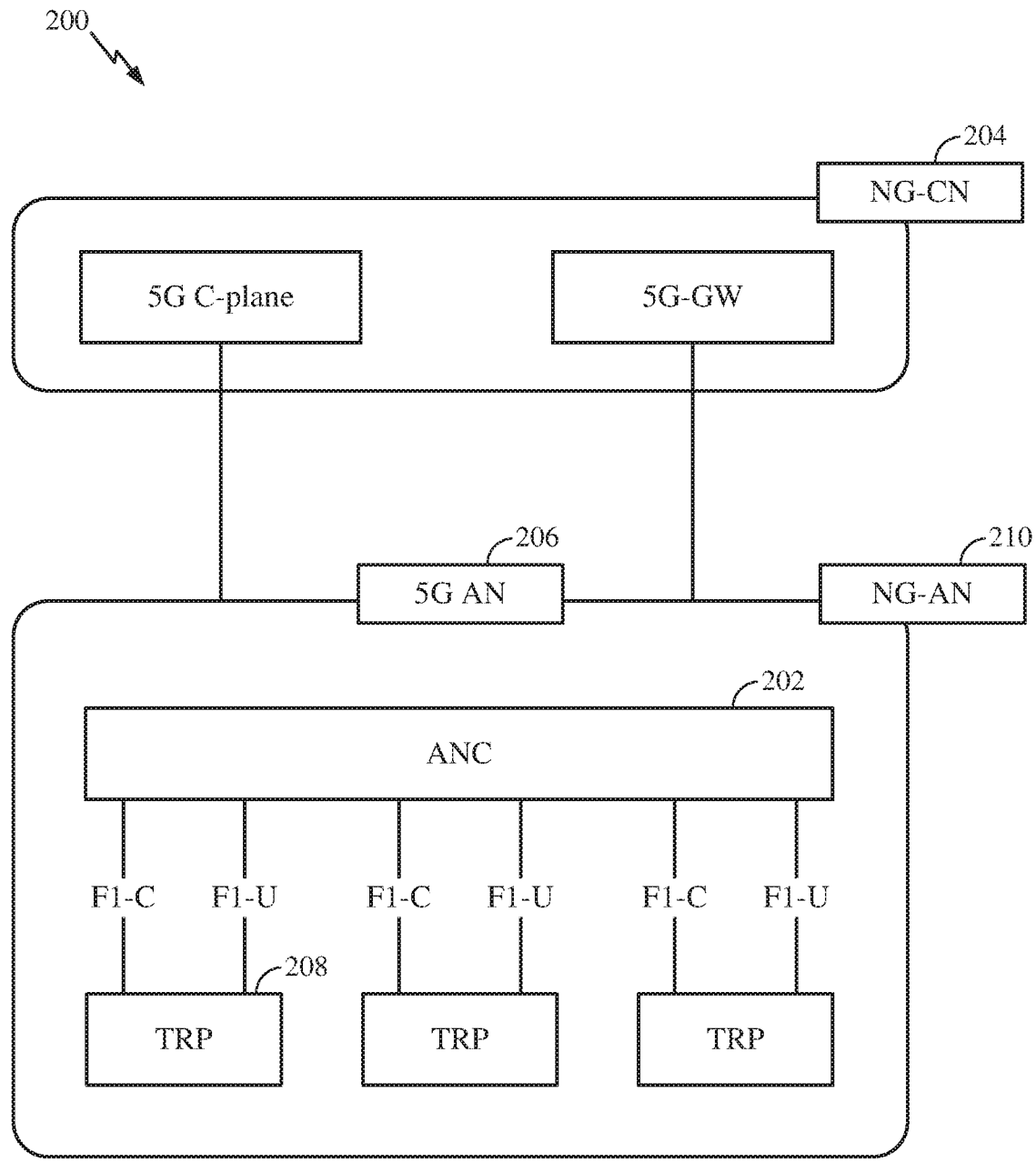
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer. Packet Data Convergence Protocol (PDCP) layer. Radio Link Control (RLC) layer, Medium Access Control (MAC) layer, and a Physical (PHY) layers may be adaptably placed at the DU (e.g., TRP 208) or CU (e.g., ANC 202).

Figure 3:
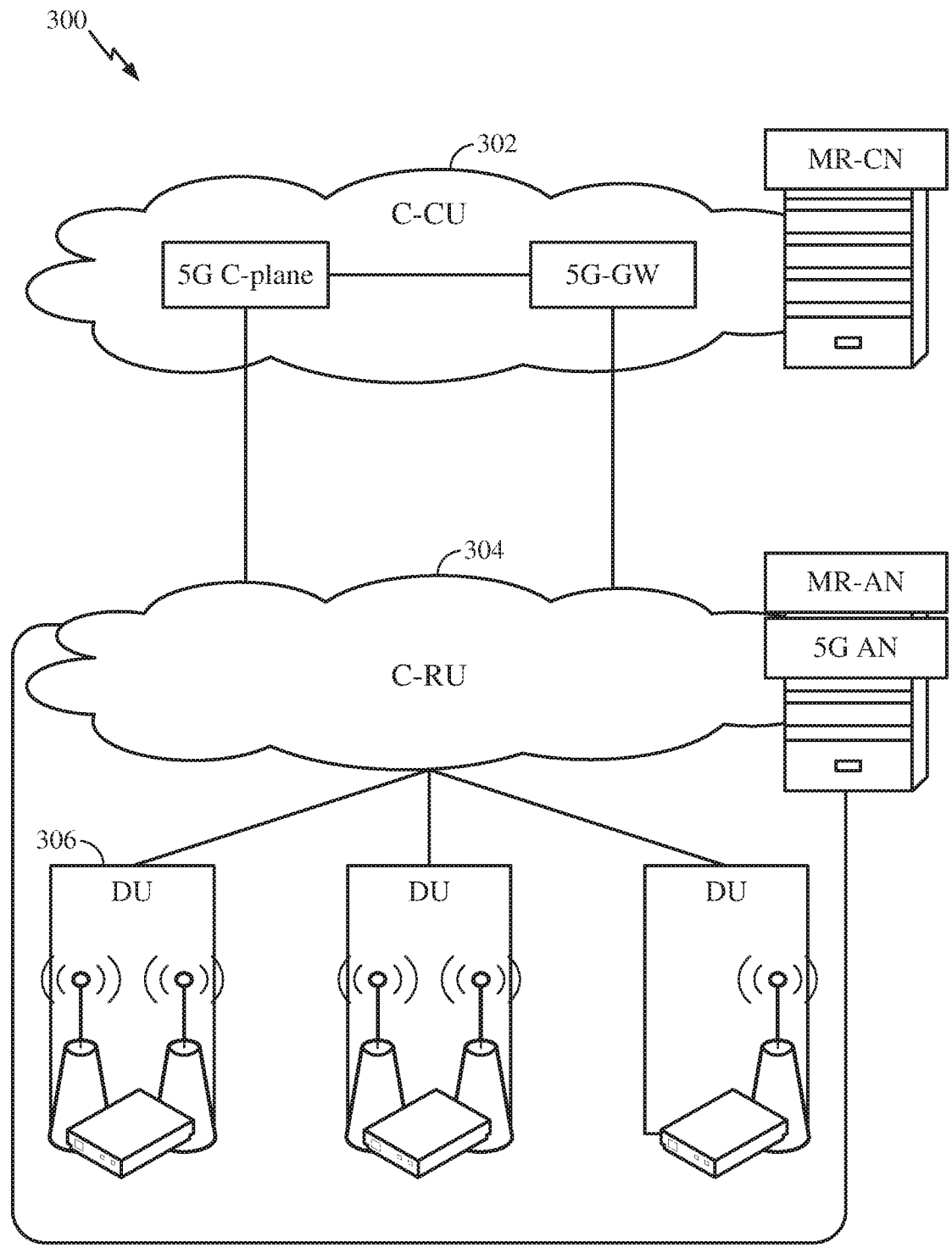
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
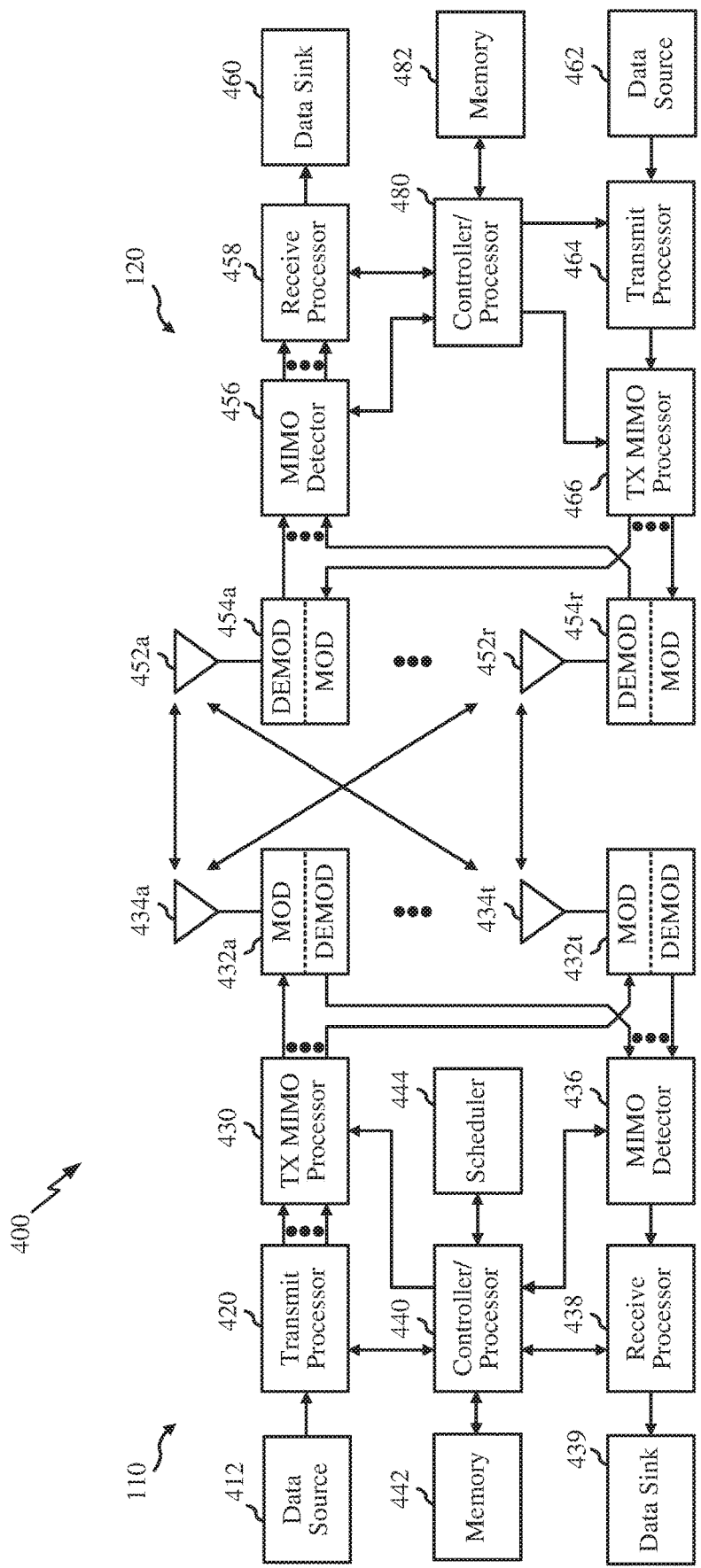
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein for a CSI report configuration for a multi-TRP transmission, such as a NOT At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
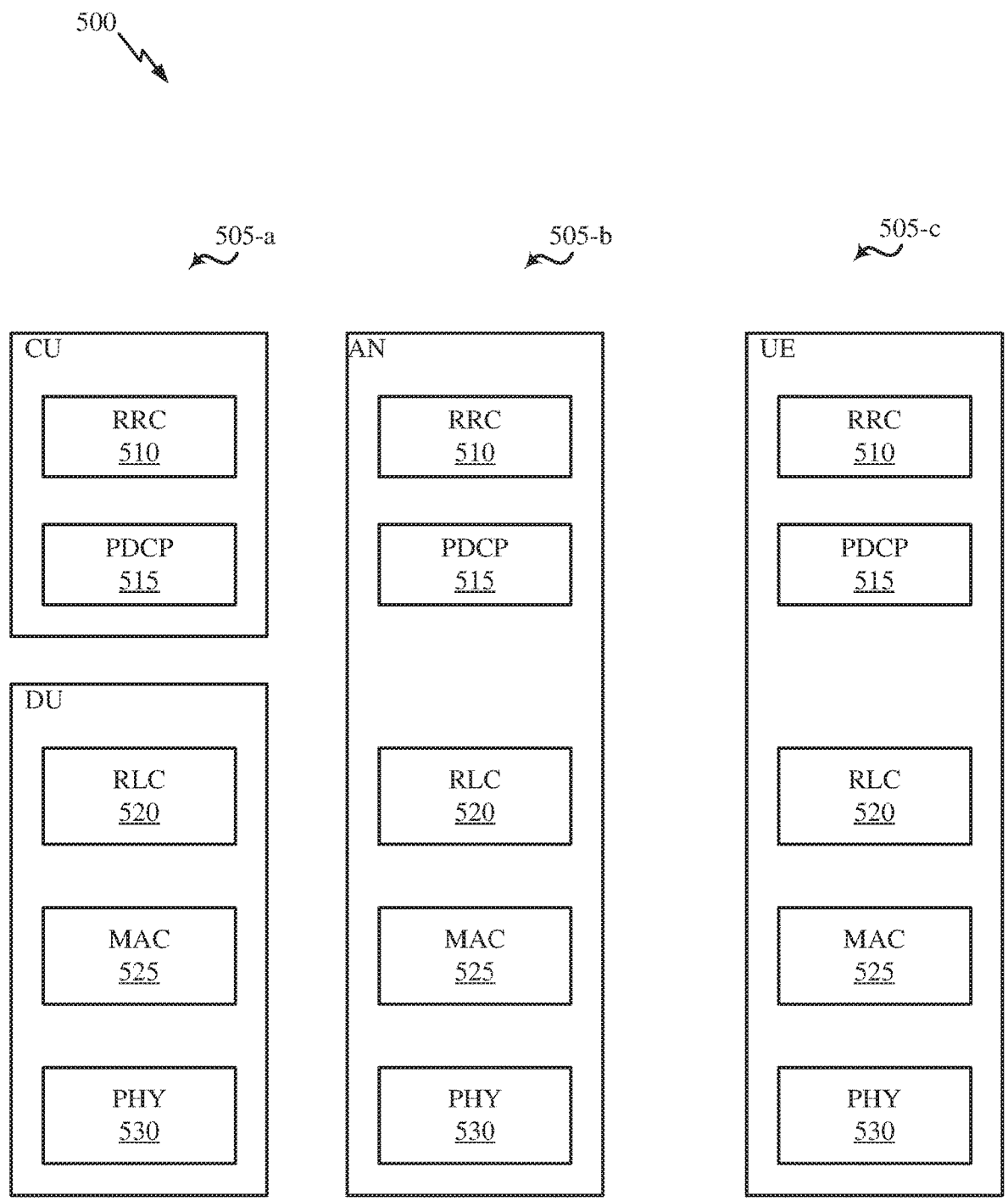
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device. In the second option. RRC layer 510. PDCP layer 515, RLC layer 520, MAC layer 525, and PHY layer 530 may each be implemented by the AN. The second option 505-*b* may be useful in, for example, a femto cell deployment.

Regardless of whether a network access device implements part or all of a protocol stack, a UE may implement an entire protocol stack as shown in 505-*c* (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . , slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
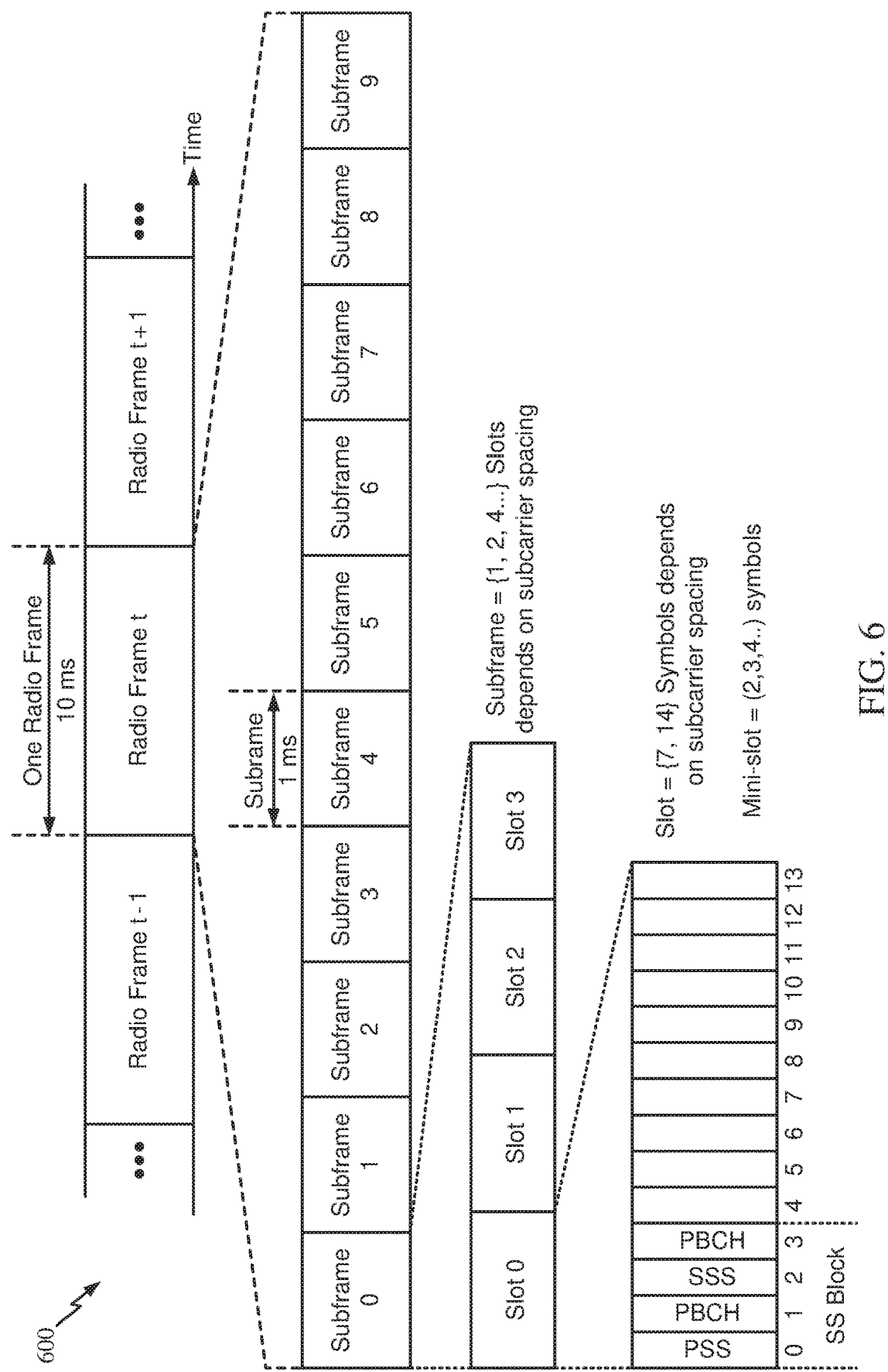
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DI/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example CSI Report Configuration for Multi-TRP Transmission

In certain wireless communication networks (e.g., new radio), non-coherent joint transmissions (NCJTs) may be used to provide multiple-input multiple-output (MIMO), multiple-user (MU) MIMO, and/or coordinated multi-point (CoMP) communications. The NCJTs may be from multiple transmission-reception points (multi-TRP), multiple panels (multi-panels) of a TRP, or a combination thereof. Coherent joint transmission requires synchronization among TRPs. However, for distributed TRPs, the precoders cannot be jointly designed and, therefore, the TRPs are not synchronized. Instead, each TRP derives the precoder independently, without knowledge of the precoders used by the other TRPs. Thus, the joint transmission is non-coherent. Via NCJT, TRPs can transmit the same data to a UE to improve the transmission reliability/coverage and/or the TRPs can transmit different data streams to the UE to improve throughput. In NCJT, the TRPs may transmit a same transport block (TB) (e.g., the same information bits although the coded bits may be the same or different).

CSI may refer to known channel properties of a communication link. The CSI may provide explicit feedback representing the combined effects of, for example, scattering, fading, and power decay with distance between a transmitter and receiver. The CSI may provide implicit feedback representing a preferred precoder and rank to be used to transmit data streams over the channel. Channel estimation using the pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically estimated at the receiver, quantized, and fed back to the transmitter.

The network (e.g., a base station (BS), may configure UEs for CSI reporting. For example, the BS configures the UE with a CSI report configuration (sometimes referred to as a 'CSI report setting') or with multiple CSI report configurations. The CSI report configuration may be provided to the UE via higher layer signaling, such as radio resource control (RRC) signaling. The CSI report configurations may be associated with CSI-RS resources for channel measurement (CM), interference measurement (IM), or both. The CSI report configuration configures CSI-RS resources (sometimes referred to as the 'CSI-RS resource setting') for measurement. The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NLP CSI-RS resource may be configured for CM.

The CSI report configuration also configures the CSI parameters (sometimes referred to as quantities) to be reported. Three codebooks include Type I single panel, Type I multi-panel, and Type II single panel. Regardless which codebook is used, the CSI report may include a channel quality indicator (CQI), a precoding matrix indicator (PMI), a CSI-RS resource indicator (CRI), and/or a rank indicator (RI). The structure of the PMI may vary based on the codebook. The CRI, RI, and CQI may be in a first part (Part I) and the PMI may be in a second part (Part II) of the CSI report. For the Type I single panel codebook, the PMI consists of a W1 matrix (e.g., subset of beams) and a W2 matrix (e.g., phase for cross polarization combination and beam selection). For the Type I multi-panel codebook, compared to type I single panel codebook, the PMI further comprises a phase for cross panel combination. For the Type II single panel codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI and semi-persistent CSI report on physical uplink control channel (PUCCH) may be triggered via RRC or a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state. The CSI report trigger for aperiodic CSI and semi-persistent CSI on PUSCH may be provided via downlink control information (DCI). The CSI-RS trigger may be signaling indicating to the UE that CSI-RS will be transmitted for the CSI-RS resource.

The UE may report the CSI feedback based on the CSI report configuration and the CSI report trigger. For example, the UE may measure the channel associated with CSI for the triggered CSI-RS resources. Based on the measurements, the UE may select a preferred CSI-RS resource. The UE reports the CSI feedback for the selected CSI-RS resource.

In some systems, the UE is configured to select one CSI-RS resource for CSI reporting. This type of CSI report configuration may be useful to support single TRP (transmission reception point) transmission. However, some systems may support multi-TRP transmission, such as non-coherent joint transmission (NCJT), where the CSI-RS of different TRPs may be transmitted in different CSI-RS resources or port groups. Accordingly, what is needed is CSI report configuration for multi-TRP transmission.

Accordingly, aspects of the present disclosure provide a CSI report configuration for multi-TRP transmission such as NCJT.

Figure 7:
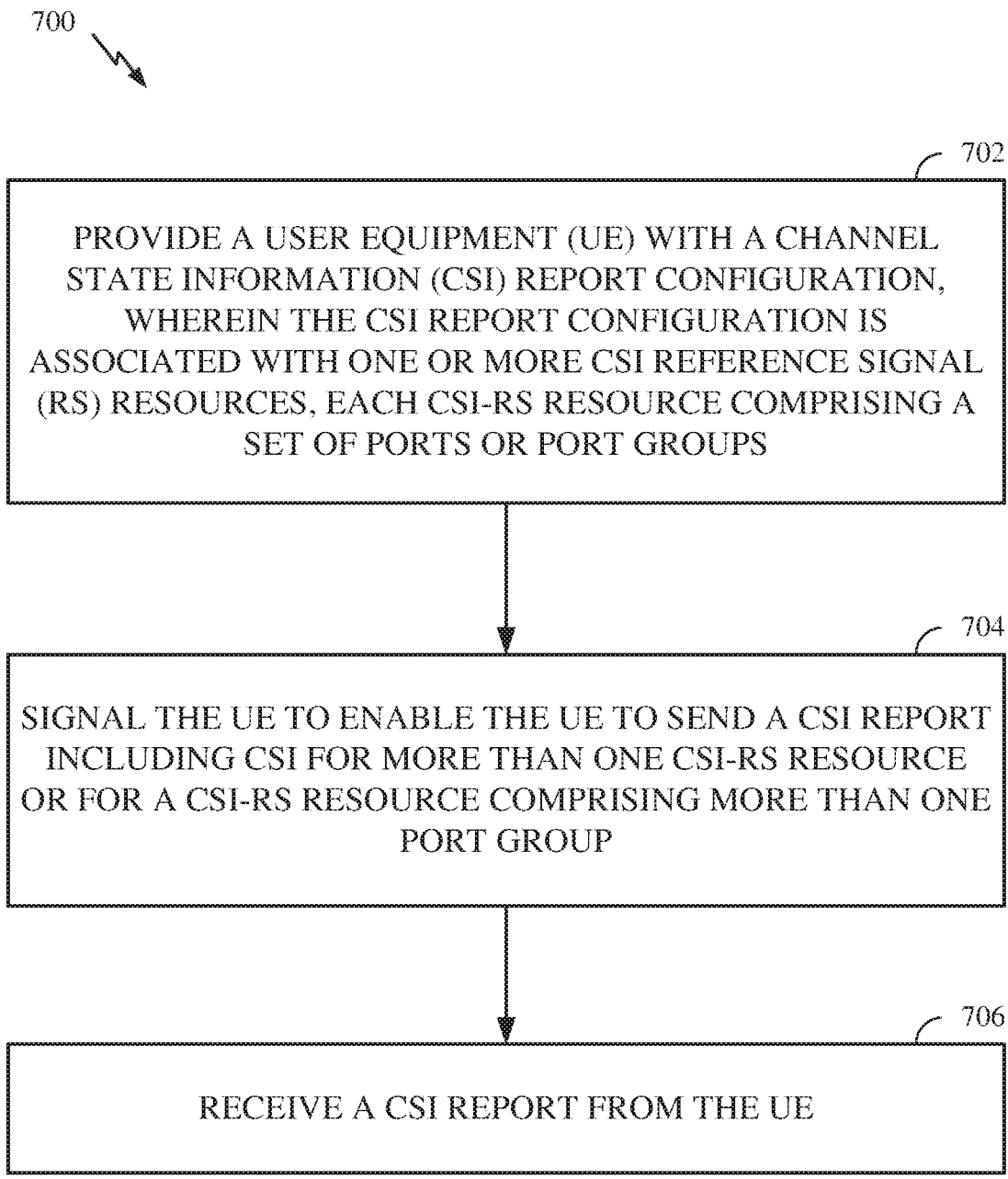
FIG. 7 is a flow diagram illustrating example operations by a BS for channel state information (CSI) report configuration for multiple transmission reception point (TRP) transmission, in accordance with certain aspects of the present disclosure.

FIG. 7 is a flow diagram illustrating example operations 700 for wireless communications, in accordance with certain aspects of the present disclosure. The operations 700 may be performed, for example, by a BS (e.g., such as a BS 110 in the wireless communication network 100) for CSI report configuration for multi-TRP transmission.

The operations 700 may begin, at 702, by providing a UE (e.g., such as a UE 120 in the wireless communication network 100) with a CSI report configuration. The CSI report configuration is associated with one or more CSI-RS resources. Each CSI-RS resource includes a set of ports or port groups. For example, the ports of the CSI-RS resource can be categorized in multiple port groups or in one port group. If the ports of the CSI-RS resource are categorized into multiple port groups, the different port groups may correspond to different QCL (quasi-colocation) configurations. In some examples, each port group associated with a particular QCL configuration may correspond to a set of ports from a different TRP. In some examples, the ports for each CSI-RS resources may correspond to a set of ports from a different TRP. The CSI report configuration may configure the UE to select/report multiple (e.g., two) CSI-RS resources or port groups. The CSI report configuration may be provided/configured via higher layer signaling such as RRC signaling. The CSI report configuration may configure at least one NZP CSI-RS resource for CM.

At 704, the BS signals the UE to enable the UE to send a CSI report including CSI for more than one CSI-RS resource or for a CSI-RS resource including more than one port group. Thus, the signaling enables the UE to report CSI for a multi-TRP transmission. In some examples, the signaling may be provided with (e.g., as a part of) the CSI report configuration. Thus, the UE has the flexibility to report CSI for single-TRP or multi-TRP.

Example Explicit Indication

According to certain aspects, the CSI for multi-TRP may be explicitly indicated. The signaling may configure the UE to select a number (e.g., N out of M) of the configured CSI-RS resources (e.g., an explicitly specified number), which may be referred to as "NCJT Type 2". The signaling may configure the UE to select up to the number (e.g., up to N) of the configured CSI-RS resources (e.g., allowing the UE to select one or more, up to the specified number), which may be referred to as "NCJT Type 1". The number of CSI-RS resources is greater than one (e.g., the number may be 2). In some examples, one or more new report quantities may be added to the CSI report configuration configuring the UE to select the specified number of resources, or up to a specified number of resources.

The CSI report configuration may configure the UE to report CRI indicated selected resources and RI for each of the selected CSI-RS resources or port groups. Thus, if the UE selects multiple CSI-RS resources and/or a CSI-RS resource including multiple port groups, the UE may have multiple resources to indicate in CRI and multiple RI to report.

According to certain aspects, the definition/bitwidth/quantization of CRI and RI may be changed. For example, a codepoint of CRI may correspond to a resource pair, a codepoint of RI may correspond to a rank pair, and/or the CRI and RI can be jointly quantized based on a configuration table. Thus, the format and/or payload size of the CSI (e.g., Part I CSI) may be changed.

According to certain aspects. CRI and RI may be quantized (and reported) separately. The number of bits for the CRI may be based at least in part on a number of possible combinations of CSI-RS resources the UE can select. A codepoint of CRI may correspond to a pair/combination of NZP CSI-RS resources. If the UE is configured for NCJT Type 2, for example, to select N out of M configured resources, the number of bits may be equal to $$\log_2 \binom{M}{N}.$$

In an illustrative examples, for 3 configured CSI-RS resources, and the UE is configured to select 2 resources, then the UE could report 3 possible combinations of resources: CRI=0 (resource 1, resource 2); CRI=1 (resource 1, resource 3), and CRI=2 (resource 2, resource 3). On the other hand, for NCJT Type 1, the number of CRI bits is $$\log_2 \sum_{n=1}^{N} \binom{M}{N}.$$

For example, if the UE is configured to select up to 2 out of the 3 configured resources, then the UE can report 6 possible combinations of resources: CRI=0 (resource 1); CRI=1 (resource 2); CRI=2 (resource 3); CRI=3 (resource 1, resource 2); CRI=4 (resource 1, resource 3), and CRI=5 (resource 2, resource 3).

The number of bits for the RI and the definition of a codepoint of RI may be based at least in part on a number of possible combinations of ranks for the selected CSI-RS resources or based at least in part on the CRI. A codepoint of RI may correspond to a pair/combination of ranks. In some examples, up to rank 8 may be supported. If the UE selects a single CSI-RS resource, then the UE may report a 3-bit RI indicating a rank 1-8 for the selected resource. If two CSI-RS resources are selected, the UE may report a 4-bit RI to indicate ten possible rank combinations for the selected resources: (1,1), (1,2), (2,1), (2,2), (3,2), (2,3), (3,3), (4,3), (3,4) (4,4), and so on. In some examples, the RI includes one or more padding bits to keep a common bitwidth for RI for all possible combination of ranks in all possible resources selections. For example, because when a single CSI-RS resource is selected, the total number of rank hypos is 8, requiring 3-bits, while if two CSI-RS resources are selected, the total number of rank hypos is 10, requiring 4-bits, then, when a single CSI-RS resources is selected a zero-padding. More generally, the RI bitwidth may be based on a maximum possible bitwidth (e.g., based on the maximum number of resources that may be selected), and for any smaller bitwidth, padding bits may be included to maintain the maximum bitwidth.

According to certain aspects. CRI and RI may be jointly quantized (and reported). Thus, the UE may report a joint indicator that indicates CRI for the selected CSI-RS resources and the RI indicating the ranks associated with each of the selected CSI-RS resources. The number of bits for the joint CRI and RI is based at least in part on a number of possible combinations of CSI-RS resources the UE can select and number of potential ranks for the selected CSI-RS resources. In some examples, the CRI and RI can be jointly quantized based on a table, such as the example table 800 shown in FIG. 8. In the example shown in the table 800, there are 3 configured resources and rank 8 is supported. Thus, for NOT Type 1, if the UE can select up to 2 out of the 3 resources, a 6-bit joint indicator is used to indicate the 54 possible combinations of resources and ranks. For NCJT Type 2, a 5-bit joint indicator is used to indicate 30 possible combinations if the UE is configured to select 2 out of the 3 resources. As shown in the table 800, the different combinations may be associated with indices. In some examples, the table 800 (or a similar table with the combinations based on the number of configured resources and supported ranks) may be hardcoded in the BS and the UE. For example, the table may be defined in the IEEE wireless communication standards.

According to certain aspects, the BS provides the UE with a subset of the indices as a restricted set of possible combinations. The subset of indices may be provided as a bitmap, each bit indicating whether a corresponding index is available or restricted.

Example Implicit Indication

According to certain aspects, the CSI for multi-TRP may be implicitly indicated. The CSI report configuration configures at least one CSI-RS resource including multiple port groups. In some examples, the BS may emulate a pair of TRPs in one CSI-RS resource by transmitting CSI-RS in different port groups with different QCL groups. Each QCL groups corresponds to a group of CSI-RS ports associated with a different TRP.

If the UE selects a single CSI-RS resource and a codepoint of CRI indicates the selected resource. The CSI-RS resource may include ports of a TRP pair or a single TRP. For example, the CSI report configuration may configure two CSI-RS resource, each with 2 port groups (e.g., two different QCL groups). Thus, the UE may select a TRP pair of two candidate TRP pairs for NCJT. In another example, there may three candidate resources, a first CSI-RS resource with 2 ports groups and second and third candidate each with only one port group. Thus, the UE can select the first resource for NCJT or the second or third resource for single-TRP.

According to certain aspects, the number of bits for the RI and the definition of a codepoint of RT is based at least in part on a number of port groups in the selected CSI-RS resource. If the UE selects a single CSI-RS resource with only a single port group, then the UE may send a 3-bit RI (for support ranks 1-8) and if the UE selects a single CSI-RS resource with 2 port groups, then the UE may report a 4-bit RI for the 8 possible combinations: (1,1), (1,2), (2,1), (2,2), (3,2), (2,3), (3,3), (4,3), (3,4) (4,4).

At 706, the BS receives a CSI report from the UE (e.g., in accordance with the CSI report configuration). The CSI report may include CSI for a multi-TRP transmission. For example, the CRI may indicate multiple CSI-RS resources and/or a CSI-RS resource including multiple port groups. Thus, the CSI report may include multiple RI, PMI, and CQI (e.g., one for each selected CSI-RS resource and/or port group).

Figure 9:
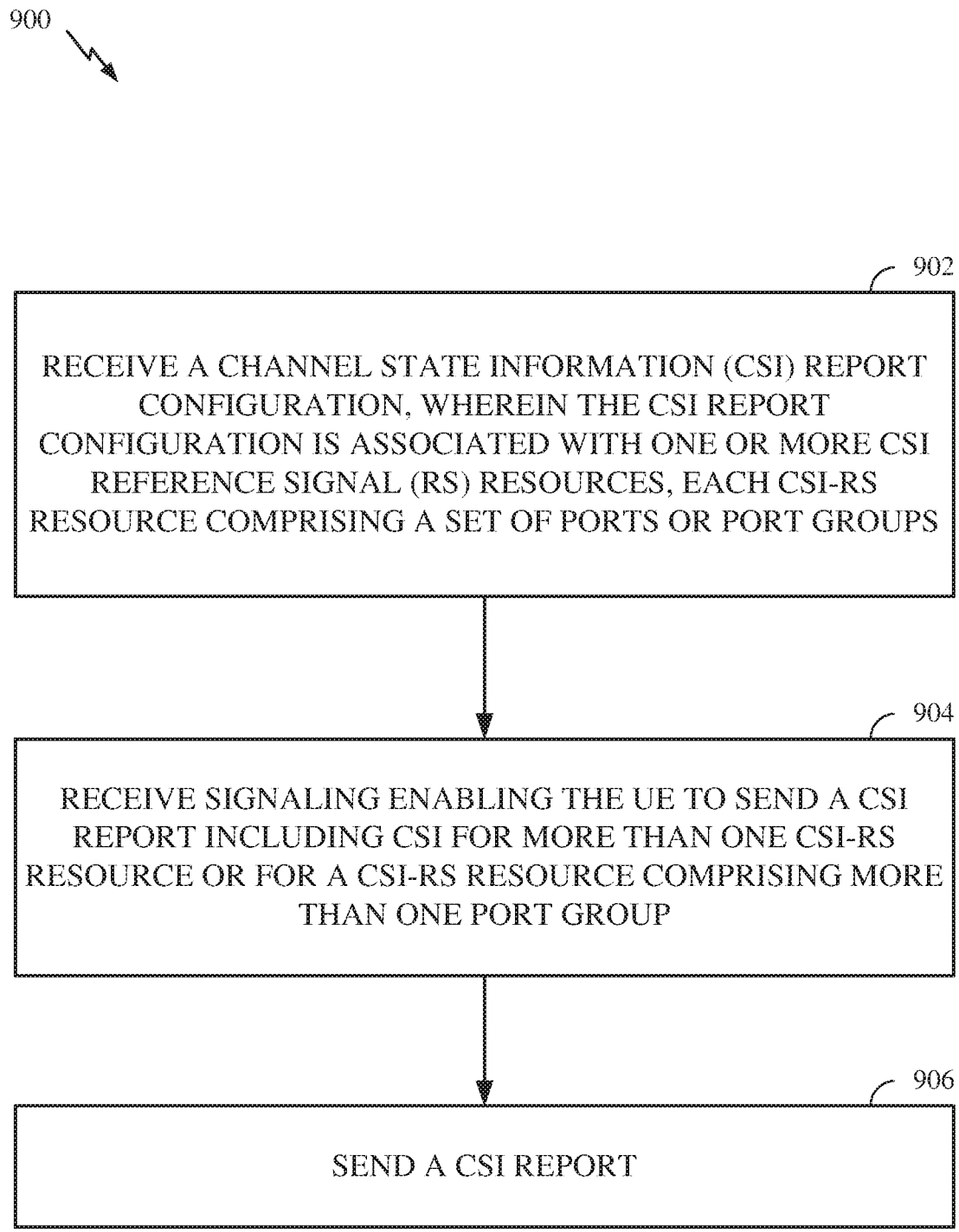
FIG. 9 is a flow diagram illustrating example operations by a UE for wireless communications, in accordance with certain aspects of the present disclosure.

FIG. 9 is a flow diagram illustrating example operations 900 for wireless communications, in accordance with certain aspects of the present disclosure. The operations 900 may be performed, for example, by a UE (e.g., such as a UE 120 in the wireless communication network 100). The operations 900 may be complementary to the operations 700 performed by the BS.

The operations 900 may begin, at 902, by receiving a CSI report configuration, the CSI report configuration being associated with one or more CSI-RS resources, and each CSI-RS resource including a set of ports or port groups.

At 904, the UE receives signaling enabling the UE to send a CSI report including CSI for more than one CSI-RS resource or for a CSI-RS resource including more than one port groups. Thus, the signaling enables the UE to flexibility choose a single-TRP or multi-TRP CSI report. The CSI report configuration may configure at least one NZP CSI-RS resource for CM. The signaling may be part of the CSI report configuration. The signaling configures the UE to select a specified number (e.g., NCJT Type 2), or up to a specified number (e.g., NCJT Type 1), of the configured CSI-RS resources. In some examples, the number is greater than one.

At 906, the UE sends a CSI report (e.g., in accordance with the CSI report configuration). The CSI report includes at least CRI indicating selected CSI-RS resources and RI for each selected CSI-RS resource or port group.

The CSI report may also include PMI and CQI for each of the selected CSI-RS resources or port groups. The CRI and RI may be separately or jointly encoded. The bitwidth of the CRI and/or RI indicators may be based on whether they are for NCJT Type 1 or Type 2, a number of the configured CSI-RS resources, a number of the supported ranks, and/or a number of resources the UE can select, which define the total number of possible combinations for the indicators. The indicator may be based on a configured table of indices corresponding to possible combinations of the indicated CSI-RS resources and/or ranks. The UE may receive a subset of indication (e.g., via a bitmap) of possible combinations from the table, which may be reduce overhead.

In some examples, the UE only selects a single CSI-RS resource and the UE reports CRI for the selected resource. The selected CSI-RS resource may include more than one port group. The UE may report RI having a number of bits based at least in part on a number of port groups in the selected CSI-RS resource.

Figure 10:
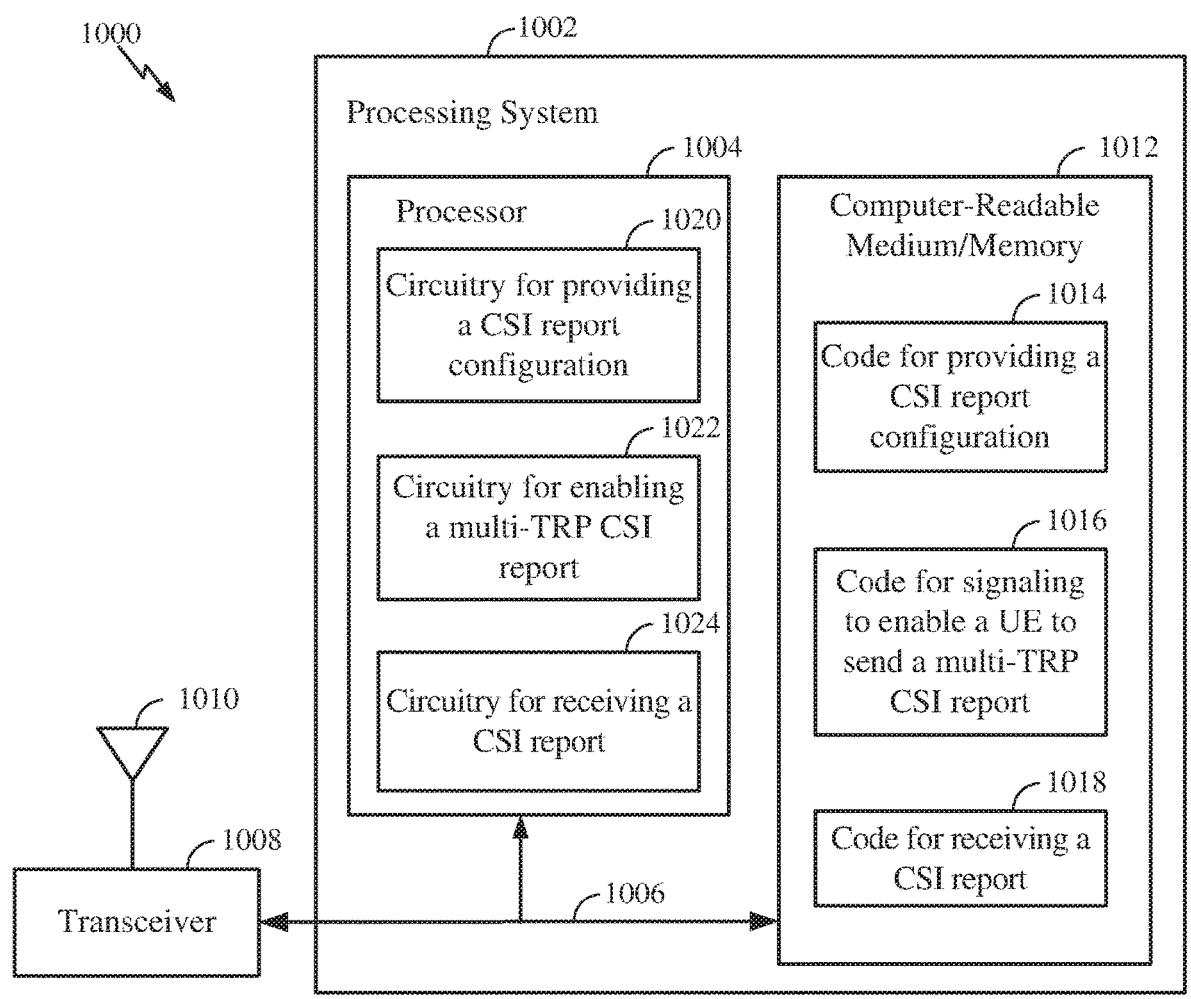
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 7. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer executable code) that when executed by the processor 1004, cause the processor 1004 to perform the operations illustrated in FIG. 7, or other operations for performing the various techniques discussed herein for a CSI report configuration for multi-TRP. In certain aspects, computer-readable medium/memory 1012 stores code 1014 for providing a CSI report configuration; code 1016 for signaling to enable a UE for a multi-TRP CSI report, for example, allowing the UE select a number, or up to a number, of configured resources; and code 1018 for receiving a CSI report. In certain aspects, the processor 1004 has circuitry configured to implement the code stored in the computer-readable medium/memory 1012. The processor 1004 includes circuitry 1020 for providing a CSI report configuration; circuitry 1022 for signaling to enable a UE for a multi-TRP CSI report, for example, allowing the UE select a number, or up to a number, of configured resources; and circuitry 1024 for receiving a CSI report.

Figure 11:
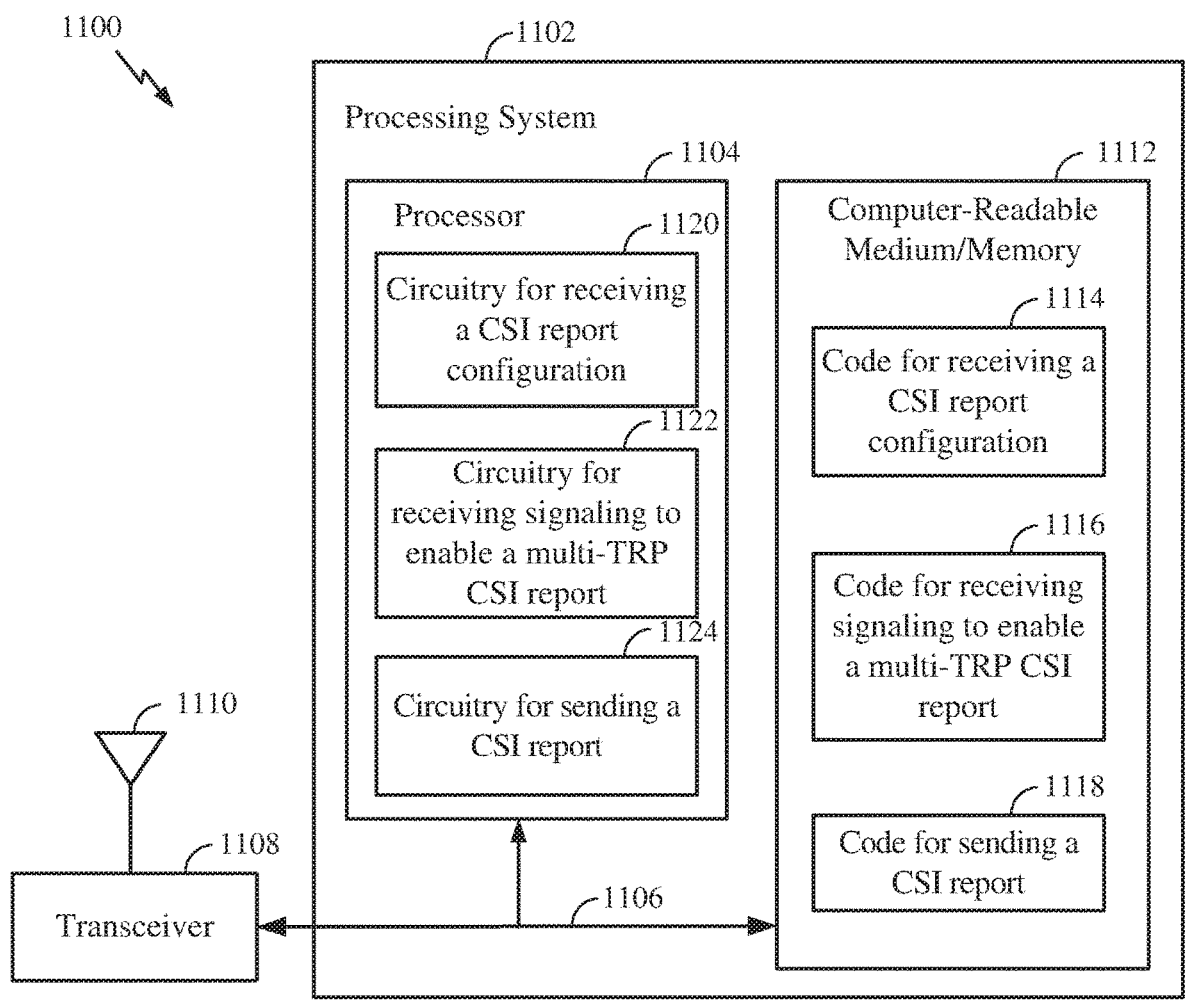
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108. The transceiver 1108 is configured to transmit and receive signals for the communications device 1100 via an antenna 1110, such as the various signals as described herein. The processing system 1112 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer executable code) that when executed by the processor 1104, cause the Processor 1004 to perform the operations illustrated in FIG. 11, or other operations for performing the various techniques discussed herein for a CSI report configuration for multi-TRP. In certain aspects, computer-readable medium/memory 1112 stores code 1114 for receiving a CSI report configuration; code 1116 for receiving signaling to enable the UE for a multi-TRP CSI report, for example, allowing the UE select a number, or up to a number, of configured resources; and code 1118 for sending a CSI report. In certain aspects, the processor 1104 has circuitry configured to implement the code stored in the computer-readable medium/memory 1112. The processor 1104 includes circuitry for circuitry 1120 for receiving a CSI report configuration; circuitry 1122 for receiving signaling to enable the UE for a multi-TRP CSI report, for example, allowing the UE select a number, or up to a number, of configured resources; and circuitry 1124 for sending a CSI report.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers. DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 7 and FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a base station (BS), comprising:
   providing a user equipment (UE) with a channel state information (CSI) report configuration,
   wherein the CSI report configuration is associated with CSI reference signal (RS) resources, each CSI-RS resource comprising a set of ports or port groups;
   signaling the UE to enable the UE to send a CSI report including CSI for more than one CSI-RS resource or for a CSI-RS resource comprising more than one port group,
   the signaling configures the UE to select a number of CSI-RS resources or up to the number of CSI-RS resources, of the CSI-RS resources that are configured, for the CSI report,
   the number of CSI-RS resources is greater than one,
   the CSI report configuration configures the UE to report a rank indicator (RI) indicating ranks with each of the selected CSI-RS resources, and
   a number of bits for the RI and a codepoint of the RI are based at least in part on a number of possible combinations of ranks for the selected CSI-RS resources; and
   receiving a CSI report from the UE.

2. The method of claim 1, wherein:
   the CSI-RS resources comprises one or more non-zero power (NZP) CSI-RS resources for channel measurement (CM).

3. The method of claim 1, wherein the CSI report configuration configures the UE to report at least one of: a precoding matrix indicator (PMI) or a channel quality indicator (CQI) associated with a rank for each of the selected CSI-RS resources or port groups.

4. The method of claim 1, wherein:
   the CSI report configuration configures the UE to report a CSI resource indicator (CRI) indicating the selected CSI-RS resources; and
   a number of bits for the CRI is based at least in part on a number of possible combinations of CSI-RS resources the UE can select.

5. The method of claim 1, wherein:
the RI includes one or more padding bits to keep a common bitwidth for RI for all possible combination of ranks in all possible resources selections.

6. The method of claim 1, wherein:
the CSI report configuration configures at least one CSI-RS resource comprising multiple port groups.

7. The method of claim 6, wherein the CSI report configuration configures the UE to report a precoding matrix indicator (PMI) and a channel quality indicator (CQI) associated with a rank for each selected CSI-RS resource or each of the port groups of a selected CSI-RS resource comprising multiple port groups.

8. A method for wireless communication by a user equipment (UE), comprising:
receiving a channel state information (CSI) report configuration,
wherein the CSI report configuration is associated with CSI reference signal (RS) resources, each CSI-RS resource comprising a set of ports or port groups;
receiving signaling enabling the UE to send a CSI report including CSI for more than one CSI-RS resource or for a CSI-RS resource comprising more than one port groups,
the signaling configures the UE to select a number of CSI-RS resources or up to the number of CSI-RS resources, of the CSI-RS resources that are configured, for the CSI report; and
the number of CSI-RS resources is greater than one; and
sending a CSI report,
the CSI report including a rank indicator (RI) indicating ranks with each of the selected CSI-RS resources, and
a number of bits for the RI and a definition of a codepoint of the RI are based at least in part on a number of possible combinations of ranks for the selected CSI-RS resources.

9. The method of claim 8, wherein:
the CSI-RS resources comprises one or more non-zero power (NZP) CSI-RS resources for channel measurement (CM).

10. The method of claim 8, wherein the CSI report includes a precoding matrix indicator (PMI) and a channel quality indicator (CQI) associated with a rank for each of the selected CSI-RS resources.

11. The method of claim 8, wherein:
the CSI report includes a CSI resource indicator (CRI) indicating the selected CSI-RS resources; and
a number of bits for the CRI is based at least in part on a number of possible combinations of CSI-RS resources the UE can select.

12. The method of claim 8, wherein:
the RI includes one or more padding bits to keep a common bitwidth for RI for all possible combination of ranks in all possible resources selections.

13. The method of claim 8, wherein:
the CSI report configuration configures at least one CSI-RS resource comprising multiple port groups.

14. The method of claim 13, wherein the CSI report includes a precoding matrix indicator (PMI) and a channel quality indicator (CQI) associated with a rank for each selected CSI-RS resource or each of the port groups of a selected CSI-RS resource comprising multiple port groups.

15. An apparatus for wireless communication, comprising:
means for providing a user equipment (UE) with a channel state information (CSI) report configuration,
wherein the CSI report configuration is associated with CSI reference signal (RS) resources, each CSI-RS resource comprising a set of ports or port groups;
means for signaling the UE to enable the UE to send a CSI report including CSI for more than one CSI-RS resource or for a CSI-RS resource comprising more than one port group,
the signaling configures the UE to select a number of CSI-RS resources or up to the number of CSI-RS resources, of the CSI-RS resources that are configured, for the CSI report,
the number of CSI-RS resources is greater than one,
the CSI report configuration configures the UE to report a joint CSI resource indicator (CRI) and rank indicator (RI), the CRI indicating the selected CSI-RS resources and the RI indicating ranks with each of the selected CSI-RS resources, and
a number of bits for the joint CRI and RI are based at least in part on a number of possible combinations of CSI-RS resources the UE can select and ranks for the selected CSI-RS resources; and
means for receiving a CSI report from the UE.

16. An apparatus for wireless communication, comprising:
means for receiving a channel state information (CSI) report configuration,
wherein the CSI report configuration is associated with CSI reference signal (RS) resources, each CSI-RS resource comprising a set of ports or port groups;
means for receiving signaling enabling the apparatus to send a CSI report including CSI for more than one CSI-RS resource or for a CSI-RS resource comprising more than one port groups,
the signaling configures the apparatus to select a number of CSI-RS resources or up to the number of CSI-RS resources, of the CSI-RS resources that are configured, for the CSI report, and
the number of CSI-RS resources is greater than one; and
means for sending a CSI report,
the CSI report including a joint CSI resource indicator (CRI) and rank indicator (RI), the CRI indicating the selected CSI-RS resources and the RI indicating ranks with each of the selected CSI-RS resources, and
a number of bits for the joint CRI and RI are based at least in part on a number of possible combinations of CSI-RS resources the UE can select and ranks for the selected CSI-RS resources.

17. An apparatus for wireless communication, comprising:
at least one processor coupled with at least one memory and configured to provide a user equipment (UE) with a channel state information (CSI) report configuration, wherein the CSI report configuration is associated with CSI reference signal (RS) resources, each CSI-RS resource comprising a set of ports or port groups, and the CSI report configuration configures at least one CSI-RS resource comprising multiple port groups;
a transmitter configured to signal the UE to enable the UE to send a CSI report including CSI for more than one CSI-RS resource or for a CSI-RS resource comprising more than one port group,
the signal configures the UE to select a number of CSI-RS resources or up to the number of CSI-RS resources, of the CSI-RS resources that are configured, for the CSI report, the number of CSI-RS resources is greater than one, the CSI report configuration configures the UE to report a CSI resource indicator (CRI) and a rank indicator (RI), the CRI indicating the selected CSI-RS resource and the RI indicating one or more ranks associated with the selected CSI-RS resource or with each of the port groups of the selected CSI-RS resource, and a number of bits for the RI and a codepoint of the RI are based at least in part on a number of port groups in the selected CSI-RS resource; and a receiver configured to receive a CSI report from the UE.

18. An apparatus for wireless communication, comprising:

a receiver configured to:

receive a channel state information (CSI) report configuration, wherein the CSI report configuration is associated with CSI reference signal (RS) resources, each CSI-RS resource comprising a set of ports or port groups, and the CSI report configuration configures at least one CSI-RS resource comprising multiple port groups;

receive signaling enabling the apparatus to send a CSI report including CSI for more than one CSI-RS resource or for a CSI-RS resource comprising more than one port groups, the signaling configures the apparatus to select a number of CSI-RS resources or up to the number of CSI-RS resources, of the CSI-RS resources that are configured, for the CSI report, and the number of CSI-RS resources is greater than one; and a transmitter configured to send a CSI report, the CSI report including a CSI resource indicator (CRI) and a rank indicator (RI), the CRI indicating the selected CSI-RS resource and the RI indicating one or more ranks associated with the selected CSI-RS resource or with each of the port groups of the selected CSI-RS resource, and a number of bits for the RI and each codepoint of the RI are based at least in part on a number of port groups in the selected CSI-RS resource.

19. A non-transitory computer readable medium having computer executable code stored thereon for wireless communication, comprising:

code for providing a user equipment (UE) with a channel state information (CSI) report configuration, wherein the CSI report configuration is associated with CSI reference signal (RS) resources, each CSI-RS resource comprising a set of ports or port groups;

code for signaling the UE to enable the UE to send a CSI report including CSI for more than one CSI-RS resource or for a CSI-RS resource comprising more than one port group, the signaling configures the UE to select a number of CSI-RS resources or up to the number of CSI-RS resources, of the CSI-RS resources that are configured, for the CSI report, the number of CSI-RS resources is greater than ones the CSI report configuration configures the UE to report a rank indicator (RI) indicating ranks with each of the selected CSI-RS resources, and a number of bits for the RI and a codepoint of the RI are based at least in part on a number of possible combinations of ranks for the selected CSI-RS resources; and code for receiving a CSI report from the UE.

20. A non-transitory computer readable medium having computer executable code stored thereon for wireless communication, comprising:

code for receiving a channel state information (CSI) report configuration, wherein the CSI report configuration is associated with CSI reference signal (RS) resources, each CSI-RS resource comprising a set of ports or port groups;

code for receiving signaling enabling a user equipment (UE) to send a CSI report including CSI for more than one CSI-RS resource or for a CSI-RS resource comprising more than one port groups, the signaling configures a user equipment to select a number of CSI-RS resources or up to the number of CSI-RS resources, of the CSI-RS resources that are configured, for the CSI report, and the number of CSI-RS resources is greater than one; and code for sending a CSI report, the CSI report including a rank indicator (RI) indicating ranks with each of the selected CSI-RS resources, and a number of bits for the RI and a definition of a codepoint of the RI are based at least in part on a number of possible combinations of ranks for the selected CSI-RS resources.

* * * * *